(12) United States Patent
Shiraishi et al.

(10) Patent No.: US 6,417,478 B1
(45) Date of Patent: Jul. 9, 2002

(54) METHOD FOR ANODIC BONDING

(75) Inventors: Masayoshi Shiraishi; Kiyoshi Aratake; Yasuhiro Nohara, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/493,759

(22) Filed: Jan. 28, 2000

(30) Foreign Application Priority Data

Jan. 29, 1999 (JP) .............................. 11-023081
Jan. 27, 2000 (JP) ........................ 2000-019220

(51) Int. Cl.⁷ .............................................. B23K 11/16
(52) U.S. Cl. ...................... 219/78.02; 65/59.4
(58) Field of Search ................... 219/78.02; 156/273.1; 65/36, 40, 59.4, 59.1

(56) References Cited

U.S. PATENT DOCUMENTS

| | | | | |
|---|---|---|---|---|
| 3,397,278 A | * | 8/1968 | Pomerantz | |
| 4,083,710 A | * | 4/1978 | Hewitt et al. | |
| 4,389,277 A | * | 6/1983 | deVries | |
| 4,393,105 A | * | 7/1983 | Kreisman | |
| 4,643,532 A | * | 2/1987 | Kleiman | |
| 5,431,806 A | * | 7/1995 | Suzuki et al. | |
| 5,663,078 A | * | 9/1997 | McCarthy | |
| 5,820,648 A | * | 10/1998 | Akaine et al. | |
| 6,113,218 A | * | 9/2000 | Atobe et al. | |

* cited by examiner

Primary Examiner—Tom Dunn
Assistant Examiner—Colleen P Cooke
(74) Attorney, Agent, or Firm—Adams & Wilks

(57) ABSTRACT

To provide an anodic bonding method which can favorably bond between members different in thermal expansion coefficient. In an anodic bonding method of applying a voltage to and bonding between a first member 10 having a bonding film 11 on a bonding surface and a second member 12 closely put on the bonding surface of the first member 10 through the bonding film 11 in a manner that the first member 10 is rendered as an anode, characterized in that: the bonding film 11 is of a metal film and the second member 12 is of a soda-lime glass, and a bonding temperature is at 100–200° C. and an application voltage is at 0.5–5.0 kV.

26 Claims, 5 Drawing Sheets

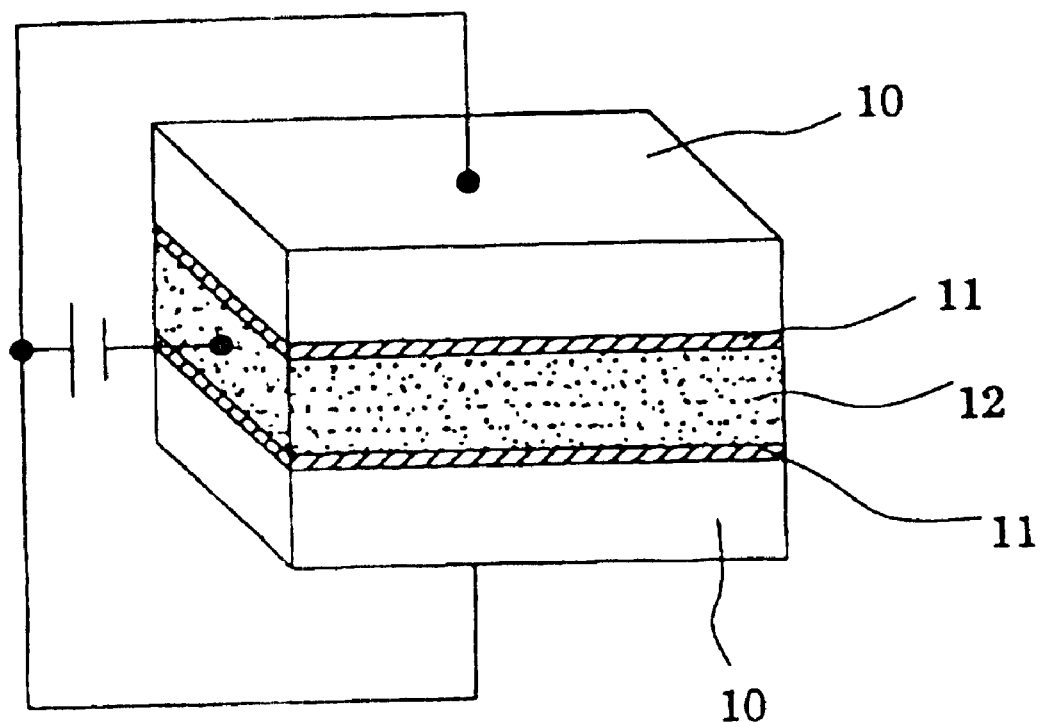
F I G. 4

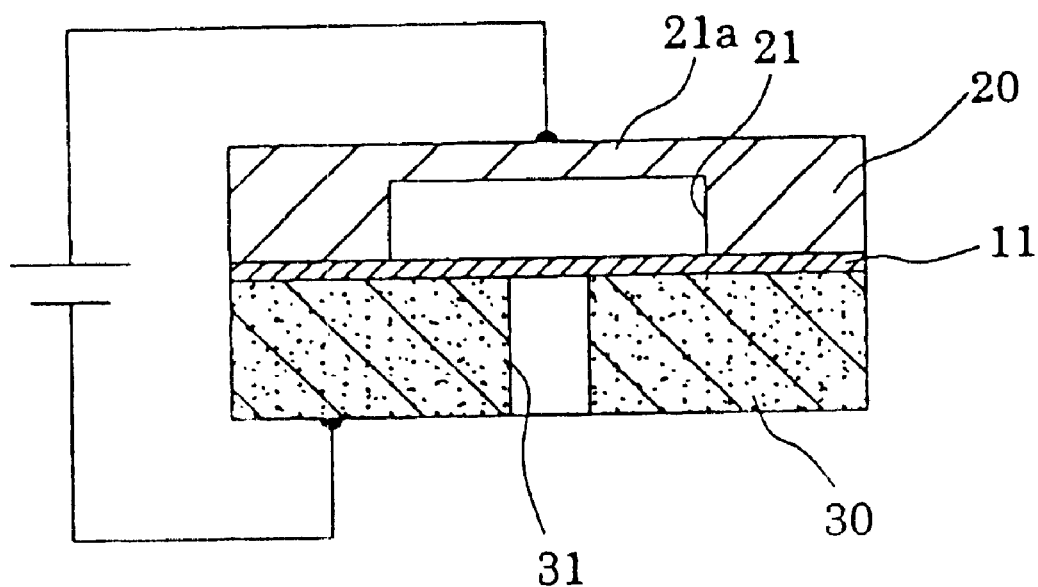
F I G. 5

METHOD FOR ANODIC BONDING

BACKGROUND OF THE INVENTION

The present invention relates to anodic bonding and, more particularly, to an anodic bonding method which can favorably bond a substrate material and a glass member through a metal film.

Conventionally, there has been known a so-called anodic bonding method in which a boric acid glass and silicon are stacked and heated up to a temperature lower than a glass melting point to bond between the both by applying a direct current voltage of several hundreds of volts with a silicon side rendered as an anode. This method is often used in the field of semiconductor devices.

However, this anodic bonding method is usually conducted by heating up to approximately 300–400° C. There is a problem in that, where the materials to be bonded are largely different in thermal expansion coefficient, it is difficult to achieve a favorable bonding. That is, where there is a difference in thermal expansion coefficient, crack or breakage tend to occur as the temperature increases. For example, in the case of a bonding temperature of approximately 300–400° C. as mentioned above, it is considered that the difference in thermal expansion coefficient of members to be bonded is limited to 2 ppm/° C. at most. Due to this, this anodic bonding method has been in use limited to the case of bonding between materials close in thermal expansion coefficient. Accordingly, despite the fact that there have been reports concerning anodic bonding methods between metals and glass, no actual products have been found.

The present invention has been made in view of such circumstances, and it is an object to provide an anodic bonding method which can bond well between members different in thermal expansion coefficient.

SUMMARY OF THE INVENTION

A first aspect of the invention for solving the above problem is an anodic bonding method for applying a voltage to and bonding between a first member having a bonding film on a bonding surface and a second member closely put on the bonding surface of the first member through the bonding film in a manner such that the first member is rendered as an anode, wherein the bonding film is formed of a metal film and the second member is formed of a soda-lime glass, and a bonding temperature is at 100–200° C. and an application voltage is at 0.5–5.0 kV.

A second aspect of the invention is an anodic bonding method wherein, in the first aspect, the metal film is selected from the group consisting of aluminum, chromium and an alloy of these metals.

In accordance with the invention as described above, due to conducting anodic bonding at low temperature it is possible to bond well between members different in thermal expansion coefficient through a metal film.

BRIEF DESCRIPTION OF THE DRAWINGS

FIG. 4 is a schematic view showing an anodic bonding process according to another embodiment of the invention; and FIG. 5 is a schematic view of a pressure detection device using the bonding method according to the invention.

DETAILED DESCRIPTION OF THE PREFERRED EMBODIMENTS

Hereunder, the present invention will be explained in detail based on the drawings.

The present embodiment is an example where a glass member is bonded through a metal film onto one surface of a substrate material of a ceramic or quartz ($SiO_2$) wafer or the like and, a process thereof is explained. Incidentally, FIG. 1 is a schematic view showing a process of bonding a substrate material and a glass member.

Figure 1A:
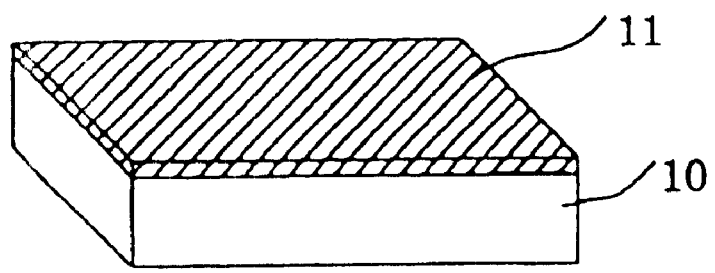
FIG. 1 is a schematic view showing an anodic bonding process according to one embodiment of the invention.

First, as shown in FIG. 1A, in the present embodiment a metal film 11 is formed by sputtering onto a bonding surface of the substrate material 10 such as a quartz wafer. The material of this metal film 11 is not especially limited thereto but suitably uses aluminum (Al), chromium (Cr) or the like. In the present embodiment a metal film 11 of aluminum was formed to a thickness of approximately 300–3000 angstroms.

Figure 1B:
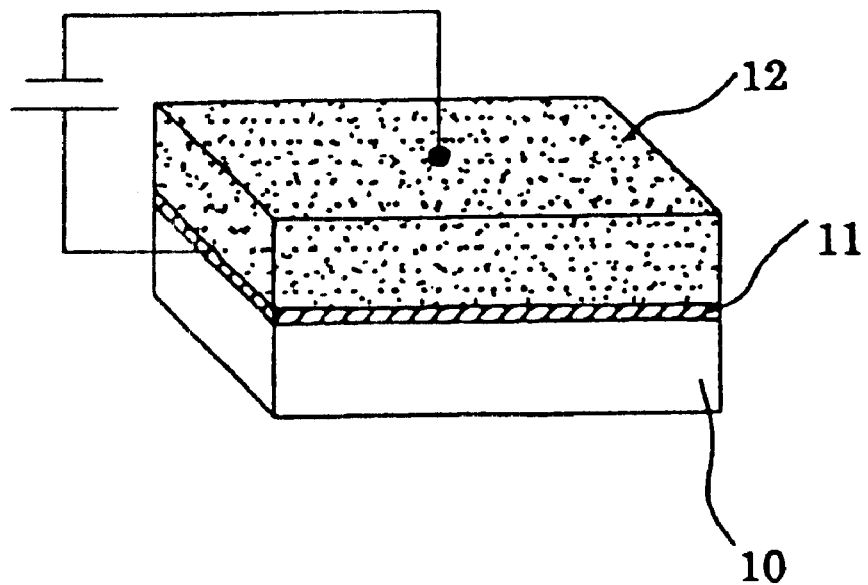

Next, as shown in FIG. 1B, a glass member 12 is placed on the metal film 11 provided on the substrate material 10. These substrate material 10 and glass member 12 are bonded by so-called anodic bonding. That is, these members are heated up, in the present embodiment, to approximately 120° C. lower than a glass softening point, and a predetermined magnitude of a direct current voltage, e.g. approximately 3.5 kV in this embodiment, is applied to the metal film 11 and glass member 12 with a substrate material 10 side (the metal film 11 side) rendered as an anode. Due to this, the metal film 11 and the glass member 12 are bonded thereby bonding the substrate material 10 and the glass member 12.

Although the material of the glass member 12 to be bonded to the substrate material 10 is not especially limited and includes, for example, soda-lime glass, Pyrex glass or the like, in the present embodiment soda-lime glass was used.

Incidentally, such anodic bonding does not require, particularly, to give weight load. A voltage may be applied in a state where the both are closely adhered. For example, in the present embodiment a weight load is applied of approximately 300 g per 3 inches of substrate material 10.

In this manner, the substrate material 10 and the glass member 12 are anodically bonded through a metal film 11 under the above conditions, whereby the metal film 11 and the glass member 12 are well bonded. That is, through the metal film 11 the substrate material 10 and the glass member 12 can be well bonded.

Here, the thermal expansion coefficient of quartz used as a substrate material 10 is 13.7 ppm/° C., and the thermal expansion coefficient of soda-lime glass used as the glass member 12 is 8.5 ppm/° C. That is, the difference therebetween is 5.2 ppm/° C. and is comparatively large. They are difficult to anodically bond under the conventionally-known conditions. However, in the present embodiment, by setting the bonding temperature low, such as at about 100–200° C., and applying a comparatively high direct current voltage of about 3–5 kV to perform anodic bonding, the effect of the different thermal expansion coefficients is reduced to be extremely low and even members having a comparatively large difference in thermal expansion coefficient can be well bonded.

Figure 2:
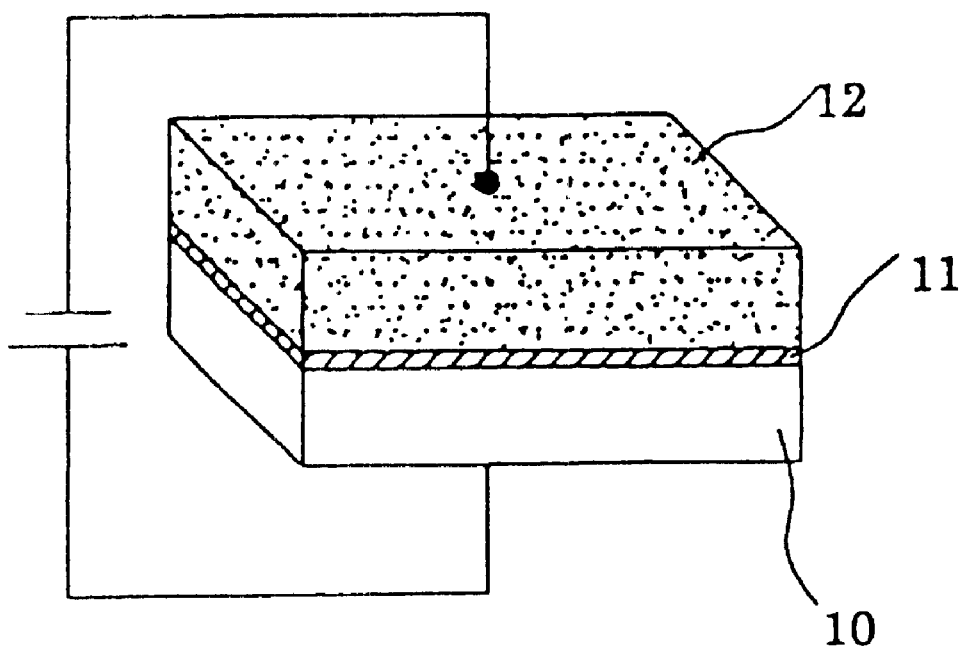
FIG. 2 is a schematic view showing an anodic bonding process according to another embodiment of the invention.

Incidentally, in the present embodiment, although the voltage upon anodic bonding may be applied to the metal film 11 and glass member 12, the invention is not limited to this. For example, as shown in FIG. 2, application may be to the substrate material 10 and the glass member 12. By such a method, the substrate material 10 and the glass member 12 can be well bonded through the metal film 11 similarly to the above.

Figure 3:
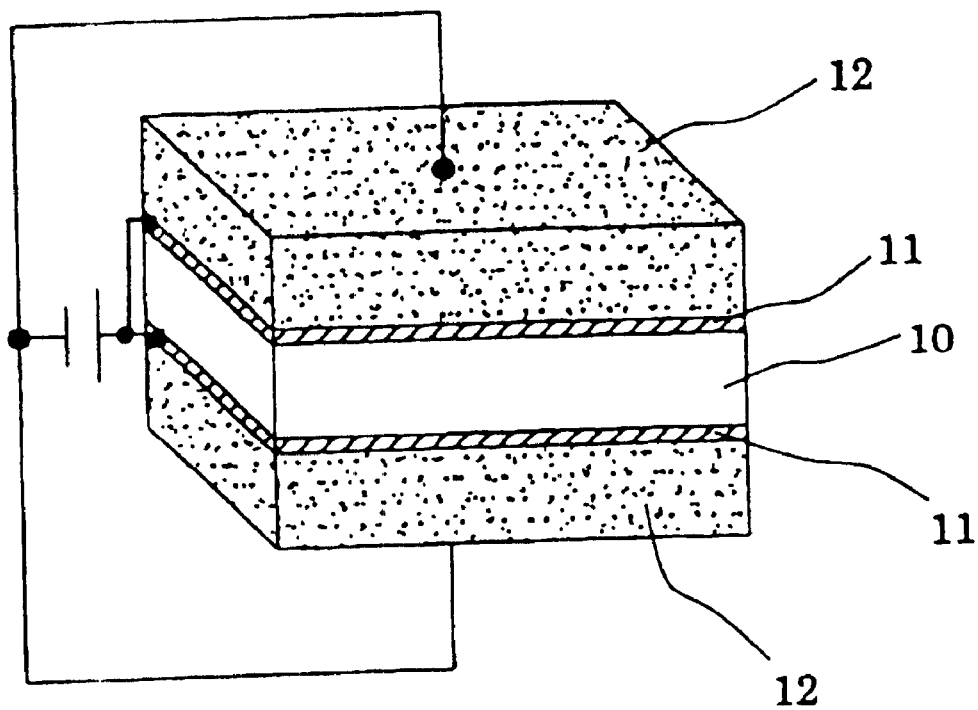
FIG. 3 is a schematic view showing an anodic bonding process according to another embodiment of the invention.

Also, although in the present embodiment, explanation was made based on the example that the glass member 12 was bonded only to one surface of the substrate member 10, it is possible, for example, to bond at a time glass members 12 respectively through metal films 11 onto opposite surfaces of the substrate material 10, as shown in FIG. 3. Of course, in this structure, bonding may be made to one side at a time while changing over with a switch or the like. Also in also this case, similarly to the above example, each member may be heated up to a predetermined temperature and a predetermined voltage may be applied to the substrate 10 and the glass members 12 on the respective sides thereof such that the substrate material 10 side is rendered an anode.

Conversely, as shown in FIG. 4, it is possible to bond substrate materials 10 having respective metal films 11 to both surfaces of the glass member 12 at one time. Also in this case, similarly to the above case, each member may be heated up to a predetermined temperature and a predetermined voltage can be applied to the glass member 12 and each substrate material 10 such that the substrate material 10 side is rendered an anode.

In either of the above cases, by setting the bonding temperature at about 100° C.–200° C. and the application voltage at 3–5 kV to perform anodic bonding, the substrate material 10 and the glass member 12 can be well bonded through a metal film 11.

Here, FIG. 5 shows an example of a pressure detection device formed by using such an anodic bonding method. The pressure detection device, as shown in FIG. 5, is a metal block 20 having a space 21 generally in a ladder form formed on one surface side by etching or the like. The thickness reduced portion constituting a bottom surface 21a of the space 21 is a diaphragm portion to receive pressure. Also, a metal film 11 is formed over a thick wall portion 20a of the entire peripheral surface on an underside of the metal block 20, at which portion a glass block 30 having a pressure introducing bore 31 is anodically bonded.

Also in this case, by performing anodic bonding under a similar condition to the above example, favorable bonding is possible for the metal block 20 and glass block 30. Dimensional accuracy can be maintained at a high accuracy.

As explained above, in the present invention, it is made possible to perform anodic bonding between members different in thermal expansion coefficient, such as in metal and glass, at low temperature and by applying a high voltage not existing in the conventional art. Due to this, the difference in thermal expansion coefficient can be reduced to a minimum, suppressing against an occurrence of thermal stresses. Accordingly, an effect is obtained in that the members different in thermal expansion coefficient can be favorably bonded by anodic bonding.

What is claimed is:

1. A method of anodic bonding comprising the steps of:
   forming a bonding film on a surface of a first member;
   placing a second member on the bonding film; and
   applying a voltage across the bonding film and the second member in such a manner that the first member is rendered as an anode;
   wherein the bonding film comprises a metal film and the second member is formed of a soda-lime glass, and a bonding temperature is set within the range of about 100–200° C. and the voltage applied across the bonding film and the second member is within the range of about 0.5–5.0 kV.

2. A method of anodic bonding according to claim 1; wherein the metal film is selected from the group consisting of aluminum, chromium and an alloy of aluminum or chromium.

3. A method of anodic bonding according to claim 1; wherein the first member is formed of glass and the bonding film is formed of aluminum or an alloy thereof, or chromium or an alloy thereof.

4. A method of anodic bonding according to claim 1; wherein the bonding film is formed on the first member by sputtering.

5. A method of anodic bonding according to claim 1; wherein a thickness of the bonding film is within the range of about 300–3000 angstroms.

6. A method of anodic bonding according to claim 1; wherein the voltage applied across the bonding film and the second member is 3.5 kV.

7. A method of anodic bonding according to claim 1; wherein the voltage applied across the bonding film and the second member is within the range of about 3–5.0 kV.

8. A method of anodic bonding according to claim 1; further comprising the step of applying a compressive load to urge the first and second members together prior to applying a voltage across the bonding film and the second member.

9. A method of anodic bonding according to claim 1; wherein the step of applying a voltage across the bonding film and the second member comprises the step of applying a voltage across the first and second members.

10. A method of anodic bonding according to claim 1; further comprising the steps of forming a second bonding film on a second surface of the first member; placing a third member on the bonding film; and applying a voltage across the second bonding film using the first member as an anode.

11. A method of anodic bonding according to claim 10; wherein the second surface of the first member is opposite the first surface.

12. A method of anodic bonding according to claim 10; wherein the second bonding film comprises a metal film and the third member is formed of glass.

13. A method of anodic bonding, comprising the steps:
   forming a bonding film of metal directly on a substrate;
   placing a glass member in direct contact with the bonding film formed on the substrate; and
   applying a voltage within the range 0.5–5.0 kV either across the bonding film and the glass member with the substrate serving as an anode, or across the substrate, bonding film and glass member with the substrate serving as an anode, to thereby anodically bond together the substrate and glass member.

14. A method of anodic bonding according to claim 13; wherein the glass member is comprised of soda-lime glass.

15. A method of anodic bonding according to claim 13; wherein a temperature of the bonding film is maintained within the range of about 100–200° C.

16. A method of anodic bonding according to claim 13; wherein the bonding film is selected from the group consisting of aluminum, chromium and an alloy of aluminum or chromium.

17. A method of anodic bonding according to claim 13; wherein the substrate is comprised of quartz and the bonding film is comprised of aluminum or an alloy thereof, or chromium or an alloy thereof.

18. A method of anodic bonding according to claim 13; wherein the bonding film is formed on the substrate by sputtering.

19. A method of anodic bonding according to claim 13; wherein a thickness of the bonding film is within the range of about 300–3000 angstroms.

20. A method of anodic bonding according to claim 13; wherein the applied voltage is within the range of about 3–5 kV.

21. A method of anodic bonding according to claim 13; wherein the applied voltage is 3.5 kV.

22. A method of anodic bonding according to claim 13; further comprising the step of applying a compressive load to urge the substrate and glass member together prior to applying the voltage.

23. A method of anodic bonding according to claim 13; wherein the substrate is comprised of ceramic.

24. A method of anodic bonding according to claim 13; wherein the substrate is comprised of quartz.

25. A method of anodic bonding according to claim 13; wherein the forming step comprises forming a bonding film of metal directly on opposite sides of the substrate; the placing step comprises placing respective glass members in direct contact with respective ones of the bonding films formed on opposite sides of the substrate; and the applying step comprises applying a voltage within the range 0.5–5.0 kV across the bonding films and the glass members with the substrate serving as an anode to thereby anodically bond together the substrate and glass members.

26. A method of anodic bonding according to claim 13; wherein the forming step comprises forming a bonding film of metal directly on two substrates; the placing step comprises placing a glass member between the two substrates such that opposite sides of the glass member are in direct contact with respective ones of the bonding films formed on the two substrates; and the applying step comprises applying a voltage within the range 0.5–5.0 kV across the two substrates, bonding films and glass member with the substrates serving as an anode to thereby anodically bond together the substrates and glass member.

* * * * *